(12) United States Patent
 Uchida

(10) Patent No.: US 6,793,402 B2
(45) Date of Patent: Sep. 21, 2004

(54) SOCKET FOR CONNECTOR

(75) Inventor: Shinji Uchida, Yokohama (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/083,509

(22) Filed: Feb. 27, 2002

(65) Prior Publication Data

US 2002/0122633 A1 Sep. 5, 2002

(30) Foreign Application Priority Data

Mar. 1, 2001 (JP) ........................................ 2001/057483

(51) Int. Cl.[7] .............................................. G02B 6/36
(52) U.S. Cl. ......................................... 385/76; 439/137
(58) Field of Search ..................... 385/76; 439/135–137

(56) References Cited

U.S. PATENT DOCUMENTS

| | | | |
|---|---|---|---|
| 4,379,607 A | * | 4/1983 | Bowden, Jr. |
| 5,020,997 A | * | 6/1991 | Calderara et al. ........... 439/137 |
| 5,967,815 A | * | 10/1999 | Schlessinger et al. ....... 439/188 |
| 6,217,353 B1 | * | 4/2001 | Yu-Tse ....................... 439/145 |

* cited by examiner

*Primary Examiner*—Khiem Nguyen
(74) *Attorney, Agent, or Firm*—Armstrong, Kratz, Quintos, Hanson & Brooks, LLP

(57) ABSTRACT

The invention provides a socket for a connector, wherein a socket housing is simplified in construction such that means for preventing foreign matter such as dust, dirt, and so forth from making ingress in the socket can be assembled with ease. The socket housing 10 comprises a cavity 20 for allowing a plug to be inserted therein, a protuberance provided within the cavity 20, a through hole defined substantially at the center of the protuberance, for allowing a plug extremity to be inserted from outer end thereof, and a connector element 70 disposed at inner end of the through hole, opposite thereto. In assembling, a shutter 50, an elastic member 60, and the connector element 70 are inserted into the socket housing 10 in that order through a narrow opening 30, and are set in, and securely attached to the socket housing 10 by fitting a cover body 80 into the narrow opening 30. Meanwhile, within the socket housing 10, an opening is defined in the wall of the through hole by cutting off a part of the wall at inner end, and when the shutter 50 is inserted into the opening, the through hole is blocked up with the shutter 50 by an urging force of the elastic member 60 while the through hole is released from a blocked state upon the insertion of the plug.

13 Claims, 17 Drawing Sheets

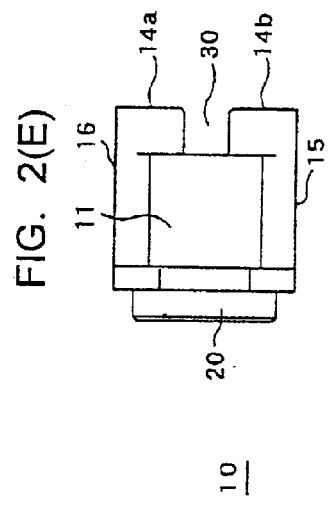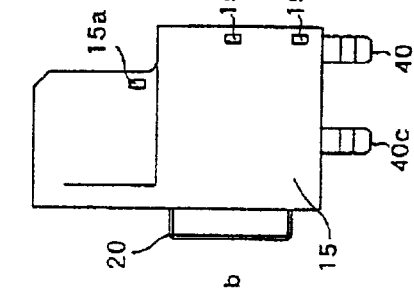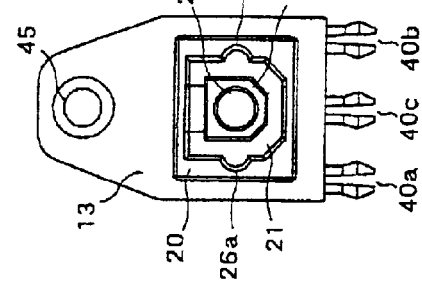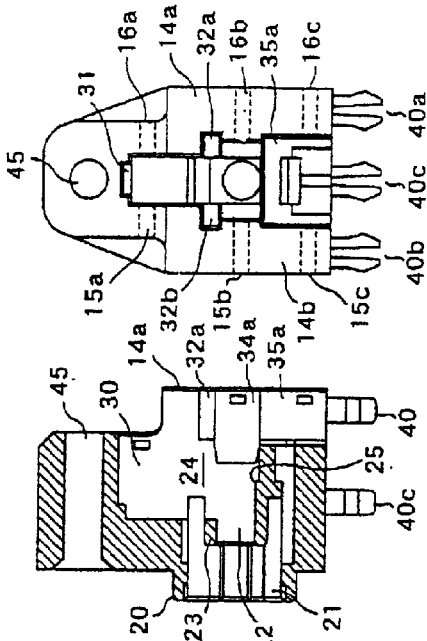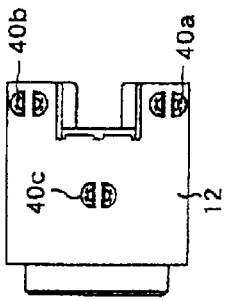

FIG. 3(D)
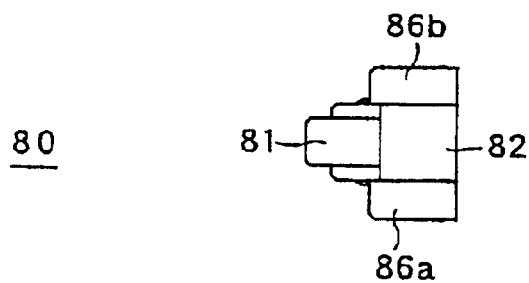
FIG. 3(A)  FIG. 3(B)  FIG. 3(C)
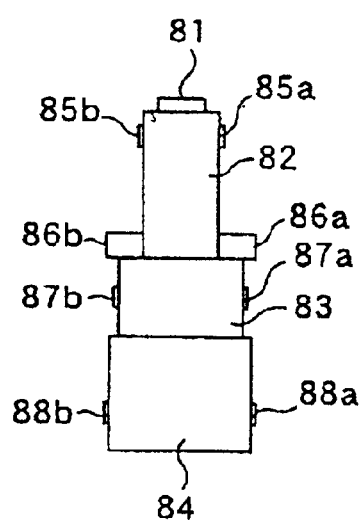 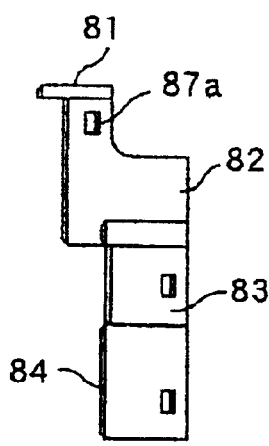 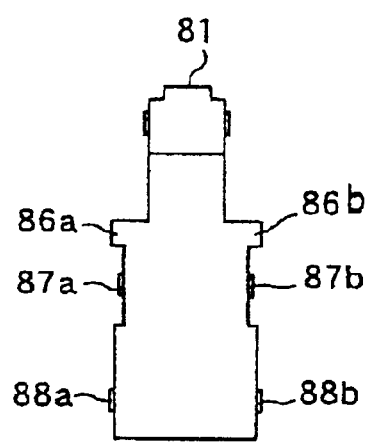
FIG. 3(E)
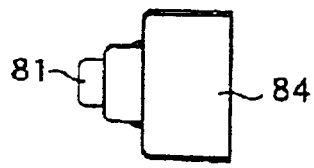

FIG. 4(D)
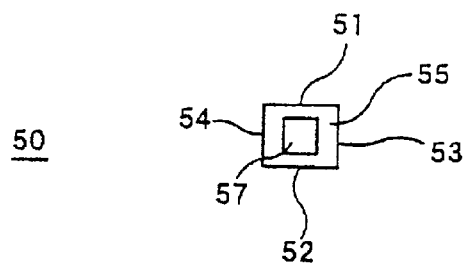
FIG. 4(A)   FIG. 4(B)   FIG. 4(C)   FIG. 4(E)
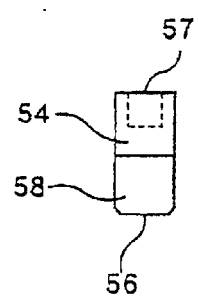 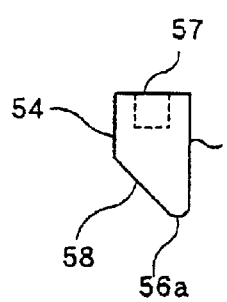 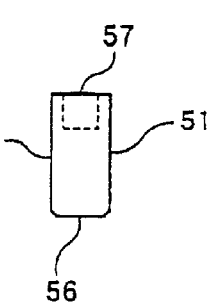 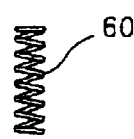
FIG. 5(C)
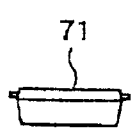
FIG. 5(A)   FIG. 5(B)
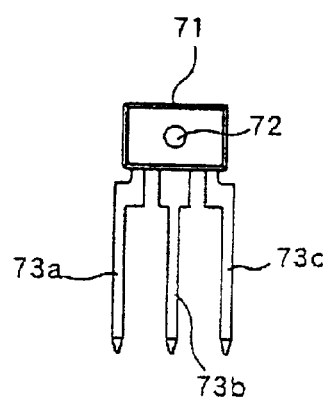 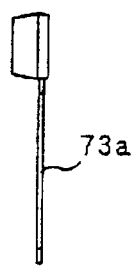

FIG. 6(A)
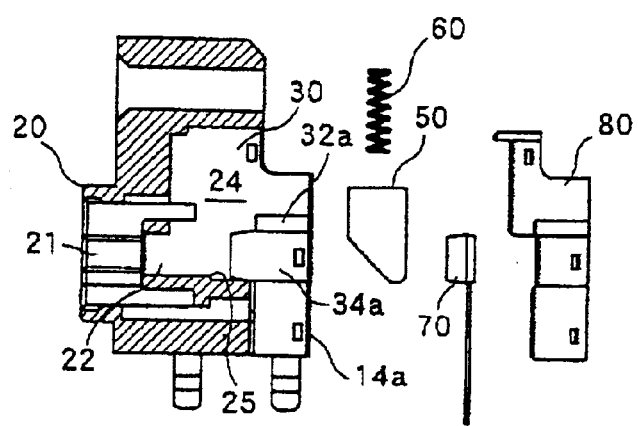
FIG. 6(B)
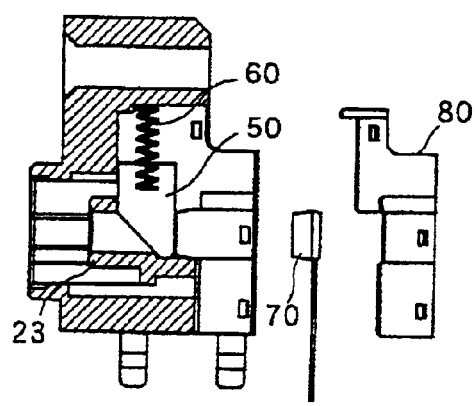
FIG. 6(C)
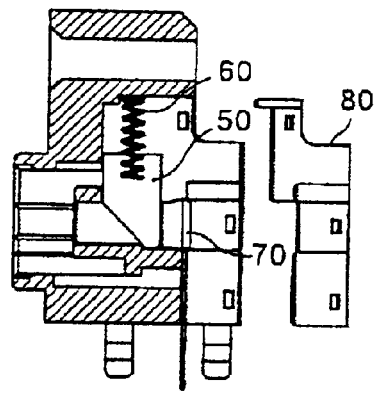
FIG. 6(E)
FIG. 6(D)
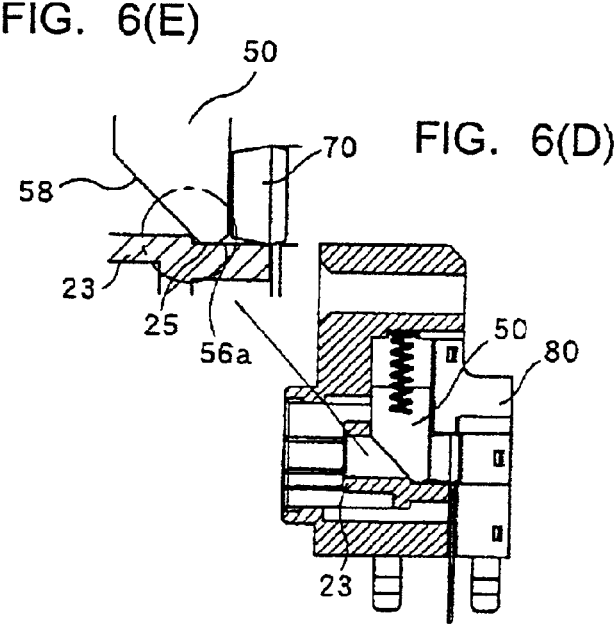

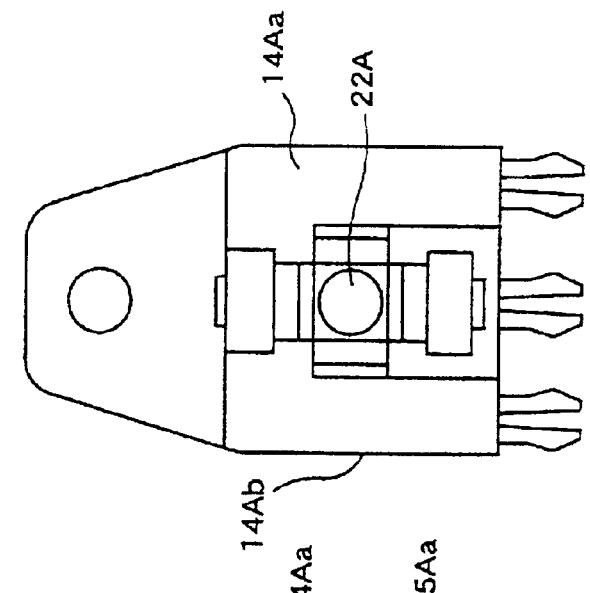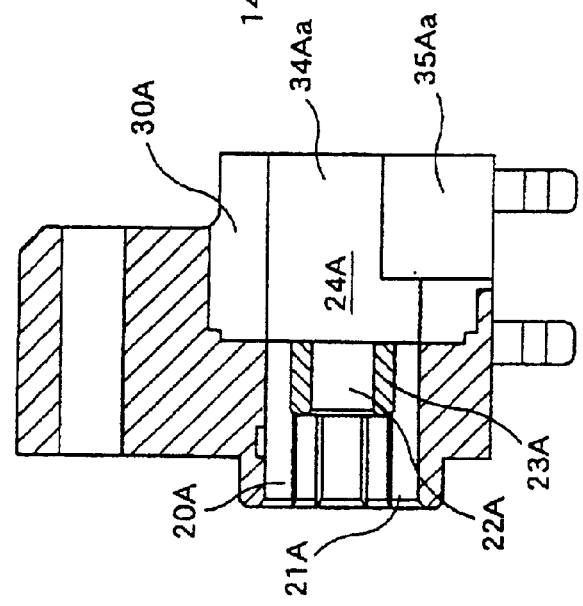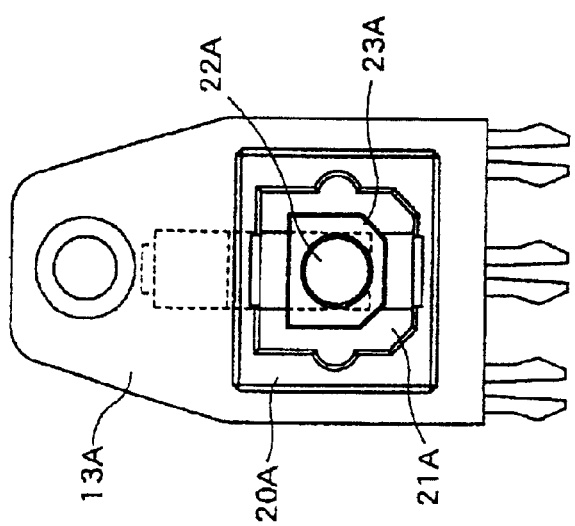

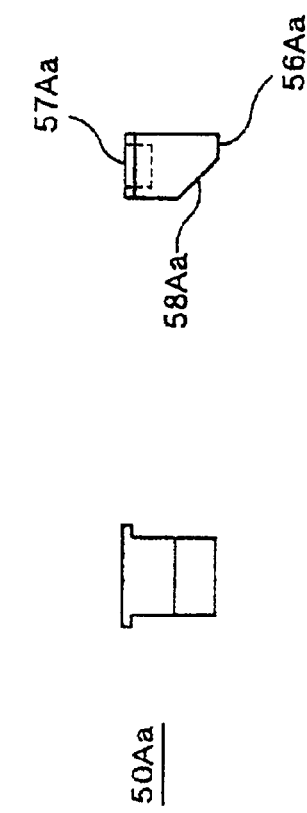
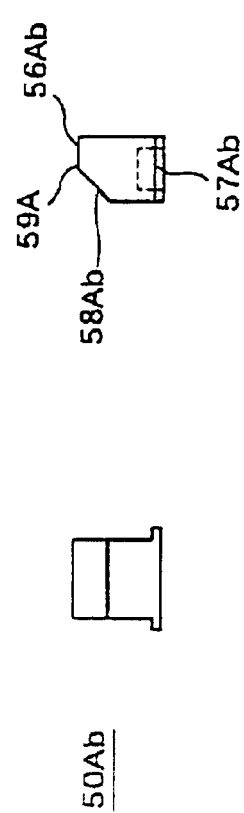
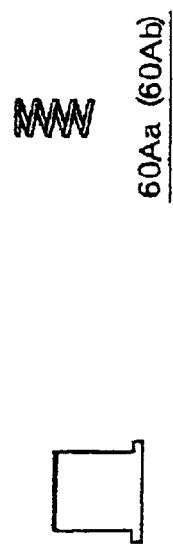

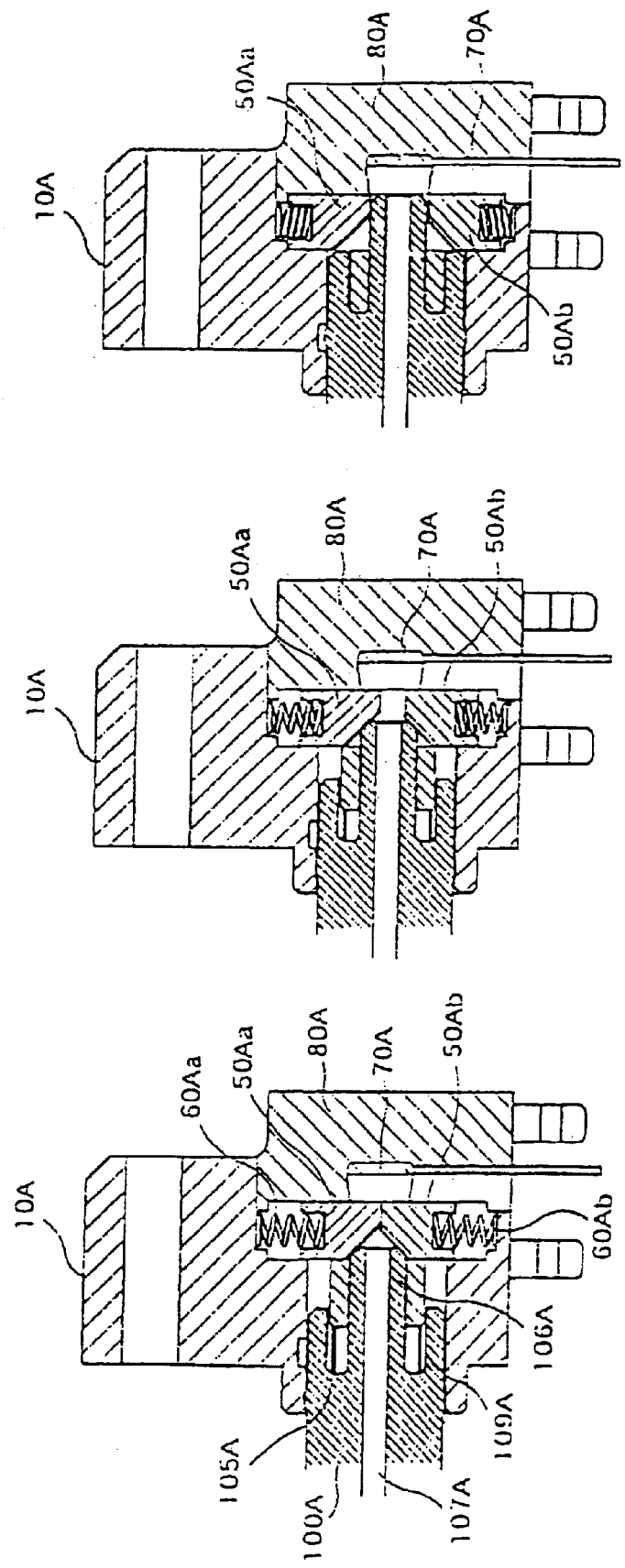

FIG. 15(A)
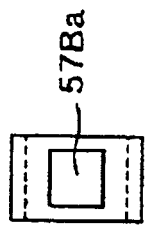
50Ba
FIG. 15(B)
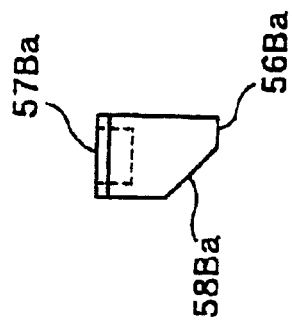
57Ba
56Ba
58Ba
FIG. 15(C)
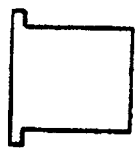
FIG. 15(D)
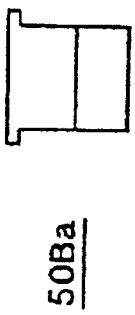
57Ba
FIG. 15(A')
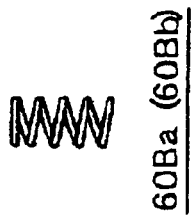
50Bb
FIG. 15(B')
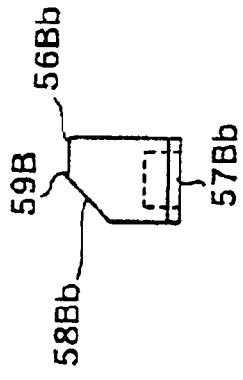
56Bb
59B
58Bb
57Bb
FIG. 15(C')
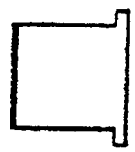
FIG. 15(E)
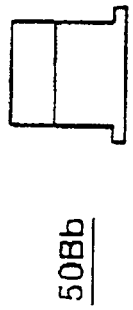
60Ba (60Bb)

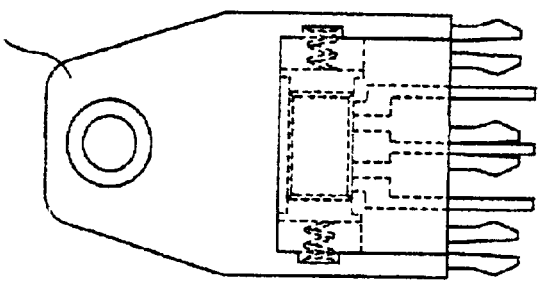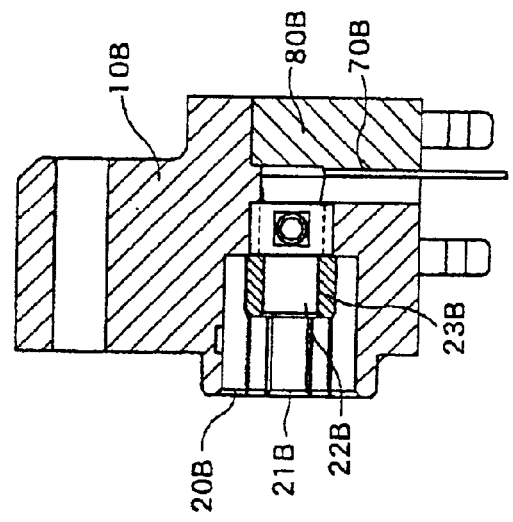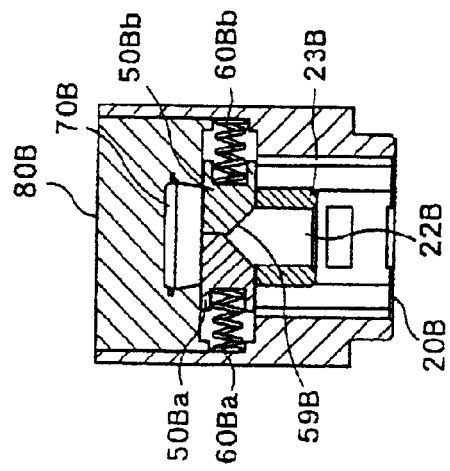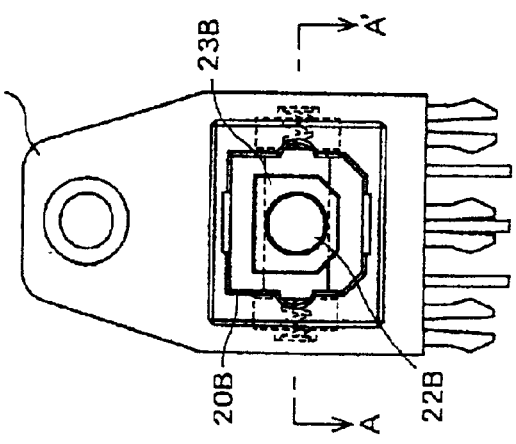

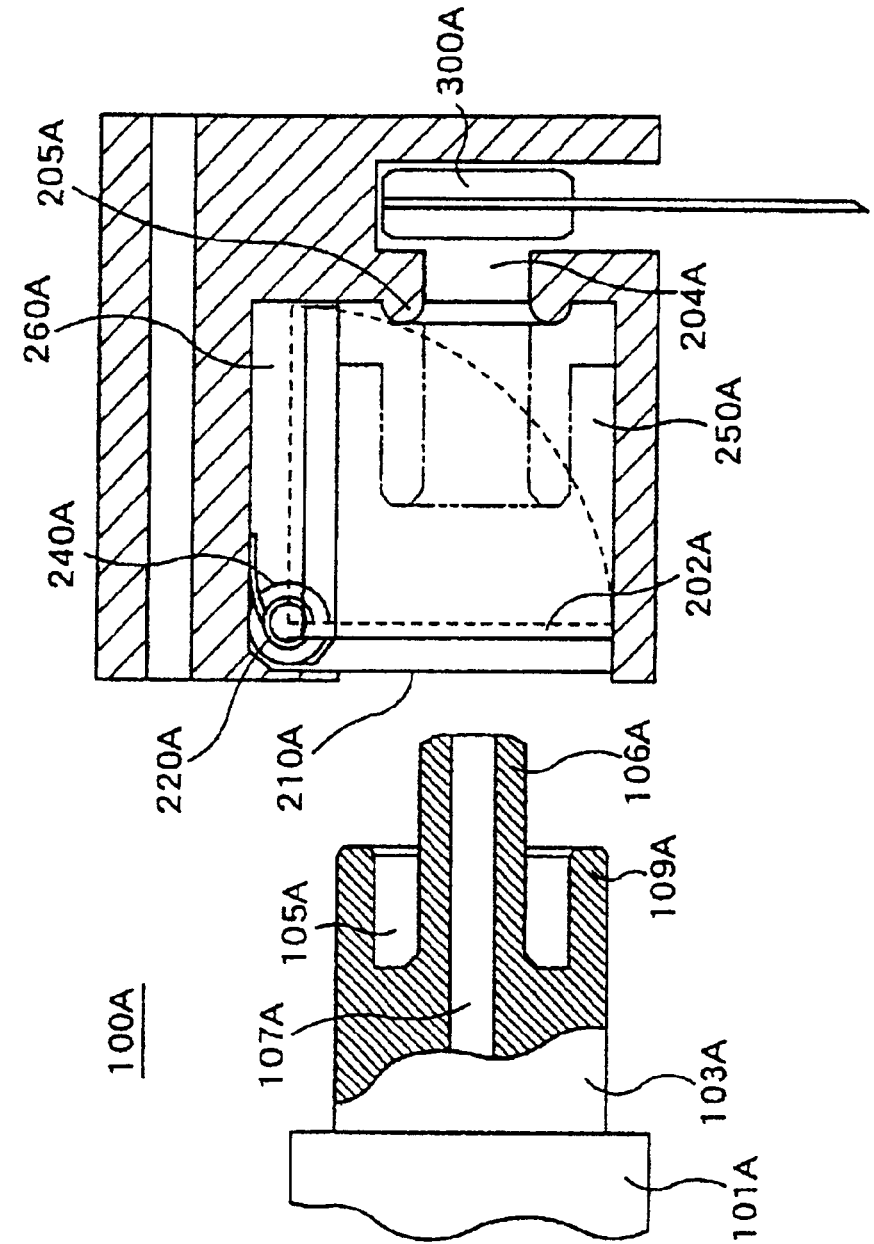

SOCKET FOR CONNECTOR

TECHNICAL FIELD OF THE INVENITON

The invention relates to a socket for use as a connector (hereinafter referred to as socket for a connector), and in particular, to a socket suitable for an optical connector, installed in a tabletop digital signal input/output device for a DVD, TV, STB (set top box: an adapter unit for satellite broadcasting), CD, MD, an amplifier, and so forth.

BACKGROUND OF THE INVENTION

With a conventional socket for a connector, for example, a socket for an optical connector, there is involved a risk that foreign matter such as dust, dirt, and so forth is allowed to make ingress in a plug hole when a plug of the optical connector has not been inserted in the plug hole, and a transmit/receive face of an optical device, disposed in the direction of the innermost part of the plug hole, is dirty, thereby deteriorating optical transfer efficiency, so that transfer of given optical signals can not be effected. Further, in the case of the optical device emitting light, there occurs leakage of the light to the outside, and consequently, a person has sometimes suffered an injury in the eyes upon looking into the plug hole.

For this reason, it has been a normal practice with the conventional socket for the optical connector to prepare in advance a cap formed in a shape substantially identical to a internal structure of the plug hole, and to fit the cap into the plug hole so as to block up the same when the plug is not inserted in the plug hole, thereby preventing injuries to the eyes as well as intrusion of foreign matter such as dust, dirt, and so forth into the plug hole.

Since the cap is a component separated from the socket, however, the cap is prone to be lost after removal from the socket when the plug is in use, and if the socket is left as it is with the plug missing, this will cause inconveniences as described above. In order to eliminate such inconveniences, there has been proposed a socket for an optical connector, provided with shutters disposed on the front of a plug hole. For example, a socket for an optical connector, provided with a shutter mechanism disposed on the front of a plug hole, is disclosed in Japanese Patent Laid-Open Publication No. 2000-131564. The socket proposed therein will be broadly described hereinafter so that the present invention can be easily understood.

FIG. 17 is a sectional view showing a plug and the socket, FIG. 17(A) a fragmentary sectional view of the plug, and FIG. 17(B) a sectional view of the socket, showing a state prior to the socket provided with a pair of shutters being coupled up with the plug.

With the socket 200 in a state where the plug 100 is yet to be inserted therein, a pair of shutters 210a, 210b are urged to an inlet side of a plug hole 202 by elastic members 240a, 240b, respectively, and consequently, the inlet side of the plug hole 202 is blocked up with the pair of the shutters 210a, 210b.

When the plug 100 is inserted into the socket 200 in such a state as described, and such insertion is started with force greater than an urging force of the elastic members 240a, 240b, respectively, the front wall of the shutters 210a, 210b, respectively, is pushed by a plug extremity 106, whereupon the respective shutters 210a, 210b are rotated, centering around axes 220a, 220b, respectively, and the extremity of the respective shutters 210a, 210b is pushed into the plug hole 202, in the direction of the innermost part thereof. When the plug 100 is further pushed, the respective shutters 210a, 210b start being guided by long extended holes 230a, 230b, respectively, serving as a guiding mechanism, and are shifted into upper and lower rooms 250a, 250b, respectively. The path of such shift of the extremity of the respective shutters 210a, 210b is indicated by a dash and double-dotted line in the figure.

Upon further pushing the plug 100 forward, the plug extremity 106 is inserted into a hole 204 defined in a protruded part 205 provided in the innermost part of the plug hole 202, and is held therein. Upon the insertion of the plug extremity 106 in the hole 204, the tip of an optical fiber 107 is butted against, or brought close to an optical device 300, whereupon transmit/receipt of optical signals is executed. In the figure, reference numeral 101 denotes a plug main body, 103 an engaging protuberance, 105 recesses, and 109 protrusions. When the plug is coupled up with the socket, the protrusions 109 are fitted into socket recesses 206, respectively, and the plug extremity 106 is stably held.

Conversely, in the case of pulling the plug 100 out of the plug hole 202, a procedure as described above is reversed. That is, the respective shutters 210a, 210b automatically return to the inlet side of the plug hole 202 by the urging force of the respective elastic members 240a, 240b while being guided by the long extended holes 230a, 230b, respectively.

With such a construction as described, however, the plug hole 202 needs to be provided with space for allowing the engaging protuberance 103 of the plug 100 to be inserted therein, the upper and lower rooms 250a, 250b, extended from the space described above, and disposed in the upper and lower edge parts thereof, respectively, on the inlet side thereof, for independently housing the shutters 210a, 210b, respectively, and the long extended holes 230a, 230b, serving as the guiding mechanism for guiding the shutters 210a, 210b between the inlet side and the upper and lower rooms 250a, 250b, respectively. Accordingly, the number of components increases, a socket housing is complex in structure, and the components are unable to be assembled with ease.

Further, another socket comprising a single shutter mechanism is disclosed in the abovementioned JP, 2000-131564, A.

FIG. 18 is a sectional view showing a plug and the socket, FIG. 18(A) a fragmentary sectional view of the plug, and FIG. 18(B) a sectional view of the socket, showing a state prior to the socket provided with the single shutter mechanism being coupled up with the plug.

With the socket 200A in a state where the plug 100A is yet to be inserted therein, a shutter 210A is urged towards an inlet side of a plug hole 202A by an elastic member 240A, and consequently, the inlet side of the plug hole 202A is blocked up with the shutter 210A. When the plug 100A is inserted into the socket 200A in such a state as described, and such insertion is started with force greater than an urging force of the elastic member 240A, the front wall of the shutter 210A is butted against, and pushed by a plug extremity 106A, whereupon the shutter 210A is rotated, centering around an axis 220A, causing the extremity of the shutter 210A to make its way into the plug hole 202, in the direction of the innermost part thereof. The path of such shift of the extremity of the shutter 210A is indicated by a dash line in the figure.

When the plug 100A is further pushed, an edge part of an engaging protuberance 103A, on the lower side thereof, come into slidable contact with the bottom face of the plug hole 202A, on the inlet side thereof, while an edge part 105A of the engaging protuberance 103A, on the upper side thereof, is butted against the front face of the shutter 210A. Upon further pushing the plug 100A forward, the shutter 210A in a horizontal posture is housed in a room 260A of the plug hole 202A, and the plug extremity 106A is inserted into a hole 204A defined in a protruded part 205A provided in the innermost part of the plug hole 202A, and is held therein. As a result of the plug extremity 106A being inserted in the hole 204A and being held therein, the tip of an optical fiber 107A is butted against, or brought close to an optical device 300A, whereupon transmit/receipt of optical signals is executed. Conversely, in the case of pulling the plug 100A out of the plug hole 202A, a procedure as described above is reversed. That is, the shutter 210A automatically returns to the inlet side of the plug hole 202A by the urging force of the elastic member 240A.

With such a construction as described, however, the plug hole 202A needs to be provided with space 250A for allowing the engaging protuberance 103A of the plug 100A to be inserted therein, and the room 260A extended from the space 250A, sufficient for housing the shutter 210A in the horizontal posture therein. Furthermore, the depth dimension of the plug hole 202A needs to be slightly larger than the height dimension of the shutter 210A. Accordingly, portions of the space 250A, indicated by a dash and double-dotted line in FIG. 18(B), become obstructive, and need to be removed at the time of molding. More specifically, the protruded part 205A, the innermost sidewall, and inner walls of the space 250A need to be shaved off in order to enlarge portions of cavity, in the innermost part of the plug hole 202A. As a result of such a change in construction, there is involved a risk of retention of the plug extremity 106A being destabilized due to a shortened length of the protruded part 205A, and a resultant decrease in the depth of the hole 204A. Meanwhile, there has been a problem with the socket in that a change in specification, in this aspect, is required to be adapted to the EIAJ specification.

SUMMARY OF THE INVENTION

The invention has been intended to solve the problems described in the foregoing, and objects of the invention are as follows.

The main object of the invention is to provide a socket for a connector, capable of maintaining high reliability thereof, more specifically, a socket for a connector, capable of preventing foreign matter such as dust, dirt, and so forth from making ingress therein Another object of the invention is to provide a socket for a connector, simple in construction, wherein the number of components constituting the socket is reduced, so that assembling is effected with ease.

Still another object of the invention is to provide a socket for a connector, simple in construction, wherein the number of components constituting the socket is reduced, so that replacement, repair, and so forth of the components as well as assembling is effected with ease.

Yet another object of the invention is to provide a socket for a connector, capable of preventing foreign matter such as dust, and so forth from making ingress therein, and eliminating leakage of light to the outside thereof without deviating from the EIAJ specification.

To achieve the above objects, the invention is achieved by the following means.

A socket for a connector according to a first aspect of the invention comprises a cavity for allowing a plug to be inserted therein, a protuberance provided within the cavity, a through hole defined substantially at the center of the protuberance, for allowing a plug extremity to be inserted from outer end thereof, and a connector element disposed at inner end of the through hole, opposite thereto, wherein an opening is defined in the wall of the through hole by cutting off a part of the wall, characterized in that when the shutter is inserted into the opening, the through hole is blocked up with the shutter by an urging force of an elastic member while the through hole is released from a blocked state upon the insertion of the plug.

Since the through hole is blocked up with the shutter prior to the insertion of the plug, foreign matter is prevented from making ingress in the socket.

The socket for a connector according to a second aspect of the invention is characterized in that, with the socket of the first aspect of the invention, the opening is defined in the wall extending either right and left in the horizontal direction or up and down in the vertical direction. Since the through hole is blocked up with the shutter prior to the insertion of the plug, foreign matter is prevented from making ingress in the socket.

The socket for a connector according to a third aspect of the invention is characterized in that, with the socket of the first or second aspect of the invention, an inclined face is formed on one end face of the shutter, and when an extremity of the inclined face is butted against the through hole, the through hole is blocked with the shutter while when the inclined face is pressed by the plug extremity, the shutter is moved against the urging force of the elastic member to release the through hole from a block state.

Since the through hole is blocked up with the shutter prior to the insertion of the plug, foreign matter is prevented from making ingress in the socket. Further, the operation of the shutter mechanism becomes smooth by the provision of the inclined face.

The socket for a connector according to a fourth aspect of the invention is characterized in that, with the socket of third aspect of the invention, a groove or a step is defined at the portion where the inclined extremity of the shutter is butted against the inner face of the through hole, causing the inclined extremity of the shutter to make ingress in the groove or butted against the step.

Since the through hole is blocked up with the shutter prior to the insertion of the plug, foreign matter is prevented from making ingress in the socket. Further, the operation of the shutter mechanism becomes smooth by the provision of the inclined face, thereby more effectively preventing foreign matter from making ingress in the socket.

The socket for a connector according to a fifth aspect of the invention comprises a cavity for allowing a plug to be inserted therein, a protuberance provided within the cavity, a through hole defined substantially at the center of the protuberance, for allowing a plug extremity to be inserted from outer end thereof, and a connector element disposed at inner end of the through hole, opposite thereto, wherein an opening is defined in the wall of the through hole by cutting off a part of the wall disposed opposite to the other end of the through hole, characterized in that when a pair of shutters are inserted into the opening, one ends of the respective shutters are urged by elastic members while the other ends of the respective shutters are brought into contact with each other to block up the through hole and the through hole is released from a blocked state upon the insertion of the plug.

Since the through hole is blocked up with the pair of shutters prior to the insertion of the plug, foreign matter is prevented from making ingress in the socket.

The socket for a connector according to a sixth aspect of the invention is characterized in that, with the socket of the fifth aspect of the invention, the opening is defined in the walls of the through hole by cutting off a part of the walls disposed opposite at inner end of the through hole in the vertical direction, wherein when the pair of shutters are inserted into the opening, one ends of the respective shutters are urged by elastic members while the other ends of the respective shutters are brought into contact with each other to block up the through hole and the through hole is released from a blocked state upon the insertion of the plug.

Since the through hole is blocked up with the pair of shutters prior to the insertion of the plug, foreign matter is prevented from making ingress in the socket.

The socket for a connector according to a seventh aspect of the fifth aspect of the invention, the opening is defined in the walls of the through hole by cutting off a part of the walls disposed opposite at inner end of the through hole in the horizontal direction, wherein when the pair of shutters are inserted into the opening, one ends of the respective shutters are urged by elastic members while the other ends of the respective shutters are brought into contact with each other to block up the through hole and the through hole is released from a blocked state upon the insertion of the plug.

Since the through hole is blocked up with the pair of shutters prior to the insertion of the plug, foreign matter is prevented from making ingress in the socket.

The socket for a connector according to an eighth aspect of the invention is characterized in that, with the socket of any of the fifth to seventh aspects of the invention, wherein inclined faces are formed on one end faces of the shutters while leaving extremities of the shutters on the one end faces by small part, and when extremities of the shutters are butted against each other, the through hole is blocked up with the shutters, while when the inclined faces are pressed by a plug extremity, the shutters are moved against the urging force of the elastic member to release the through hole from a blocked state.

Since the through hole is blocked up with the pair of shutters prior to the insertion of the plug, foreign matter is prevented from making ingress in the socket. Further, the operation of the shutter mechanism becomes smooth by the provision of the inclined face.

The socket for a connector according to a ninth aspect of the invention is characterized in that, with the socket of the eighth aspect of the invention, inclined faces are formed on one end faces of the shutters while leaving extremities of the shutters on the one end faces by small part, and a protrusion piece having elasticity is provided on the tip end of one inclined face, wherein when the extremities of the shutters are brought into contact with each other, the protrusion piece is brought into contact with the other inclined face elastically to block up the through hole, while when the inclined faces are pressed by a plug extremity, the shutters are moved against the urging force of the elastic member to release the through hole from a blocked state.

Since the through hole is blocked up with the pair of shutters prior to the insertion of the plug, foreign matter is prevented from making ingress in the socket. Further, the operation of the shutter mechanism becomes smooth by the provision of the inclined face, thereby more effectively preventing foreign matter from making ingress in the socket.

The socket for a connector according to a tenth aspect of the invention is characterized in that, with the socket of any of the first to ninth aspects of the invention, the plug is a plug for an optical connector and the connector element is an optical element. Accordingly, when the socket is coupled up with the plug for an optical connector, in a state prior to the insertion of the plug, foreign matter is prevented from making ingress in the socket. Further, the socket housing can be applied to the plug for the optical connector without changing an EIAJ specification.

The socket for a connector according to an eleventh aspect of the invention is characterized in that, with the socket of any of the first to ninth aspects of the invention, the plug is a plug for an electric connector and the connector element is an electric connector element. Accordingly, with the electric connector, foreign matter is prevented from making ingress in the socket.

A method of assembling a socket for a connector according to a twelfth aspect of the invention is characterized in comprising, using a socket defining a narrow opening in the rear face of a socket housing for allowing a shutter and components to be inserted therein and a cover body to be fitted therein, causing the shutter and the components to be fixed therein.

According to this assembling method, the configuration of the narrow opening is easily molded for allowing the components constituting the socket to be inserted and set therethrough, thereby simplifying the assembly.

A method of assembling a socket for a connector according to a thirteenth aspect of the invention is characterized in comprising, using a socket defining a narrow opening in the rear face of a socket housing, setting components on the front face of a cover body, for allowing a shutter to be inserted in the narrow opening and for allowing the cover to be fitted on the narrow opening, causing the shutter to be fixed therein.

According to this assembling method, the configuration of the narrow opening is easily molded and the components constituting the socket can be inserted and set through the narrow opening, thereby simplifying the assembly. Further, since the components are set on the cover body, thereby more simplifying the assembly.

BRIEF DESCRIPTION OF THE DRAWINGS

FIG. 2 shows a socket housing used in the socket for an optical connector according to the first embodiment of the invention, wherein FIG. 2(A) is a front view, FIG. 2(B) is a side view, FIG. 2(C) is a sectional view taken along a dash and one-dotted line A–A', FIG. 2(D) is a rear view, FIG. 2(E) is a plan view and FIG. 2(F) is a bottom view;

FIG. 3 shows a cover body used in the socket for an optical connector according to the first embodiment of the invention, wherein FIG. 3(A) is a front view, FIG. 3(B) is a side view, FIG. 3(C) is a rear view, FIG. 3(D) is a plan view, and FIG. 3(E) is a bottom view;

FIG. 4 shows a shutter used in the socket for an optical connector according to the first embodiment of the invention, wherein FIG. 4(A) is a front view, FIG. 4(B) is a side view, FIG. 4(C) is a rear view, FIG. 4(D) is a plan view, and FIG. 4(E) is a side view of an elastic member;

FIG. 5 shows an optical element used in the socket for an optical connector according to the first embodiment of the invention, wherein FIG. 5(A) is a front view, FIG. 5(B) is a side view, and FIG. 5(C) is a plan view;

FIG. 6 is a sectional view showing components to be built in the socket for an optical connector according to the first embodiment of the invention, wherein FIG. 6(A) to FIG. 6(E) are views showing a state where a shutter, the an elastic member, an optical element and a cover body are built in a socket housing;

FIG. 7 is a sectional view showing the coupling between the socket for an optical connector and a plug according to the first embodiment of the invention, wherein

FIG. 8 is a view showing a socket housing used in the socket for an optical connector according to a second embodiment of the invention, wherein FIG. 8(A) is a front view, FIG. 8(B) is a sectional view, and FIG. 8(C) is a rear view;

FIG. 9 is a view showing a cover body used in the socket for an optical connector according to the second embodiment of the invention, wherein

FIG. 10 is a view showing a pair of shutters used in the socket for an optical connector according to the second embodiment of the invention, wherein FIG. 10(A) is a front view of one shutter, FIG. 10(B) is a side view of the same, FIG. 10(C) is a rear view of the same and FIG. 10(D) is a plan view of the same, FIG. 10(A') is a front view of the other shutter, FIG. 10(B') is a side view of the same, FIG. 10(C') is a rear view of the same, and FIG. 10(E) is a side view of the elastic member;

FIG. 11 is a view showing a state where shutters, elastic members, an optical element and a cover body are built in the socket housing used in the socket for an optical connector, wherein

FIG. 12 is a sectional view showing the coupling between the socket for an optical connector and a plug according to the second embodiment of the invention, wherein FIG. 12(A) to FIG. 12(C) are views showing a state where the plug is inserted in the socket;

FIG. 13 is a view showing a socket housing used in the socket for an optical connector according to a third embodiment of the invention, wherein

FIG. 14 is a view showing a cover body used in the socket for an optical connector according to the third embodiment of the invention, wherein

FIG. 15 is a view showing a pair of shutters used in the socket for an optical connector according to the third embodiment of the invention, wherein FIG. 15(A) is a front view of one shutter, FIG. 15(B) is a side view of the same, FIG. 15(C) is a rear view of the same, FIG. 15(D) is a plan view of the same, FIG. 15(A') is a front view of the other shutter, FIG. 15(B') is a side view of the same, FIG. 15(C') is a rear view of the same and FIG. 15(E) is a side view of an elastic member, FIG. 16 is a view showing a state where shutters, elastic members, an optical element and a cover body are built in the socket housing used in the socket for an optical connector, wherein FIG. 16(A) is a front view, FIG. 16(B) is a sectional view, FIG. 16(C) is a rear view, and FIG. 16(D) is a sectional view taken along a dash and one-dotted line A–A';

FIG. 17 shows a conventional socket for an optical connector and it is a sectional view showing a state prior to the socket being coupled up with a plug, wherein FIG. 18 shows another conventional socket for an optical connector and it is a sectional view showing a state prior to the socket being coupled up with a plug, wherein FIG. 18(A) is a fragmentary sectional view of the plug, and FIG. 18(B) is a sectional view of the socket.

DETAILED DESCRIPTION OF THE INVENTION

A socket for an optical connector according to first to third embodiments of the invention is described hereinafter. The invention is not limited to a socket for an optical connector but can be also used as a general electric connector.

Figure 1:
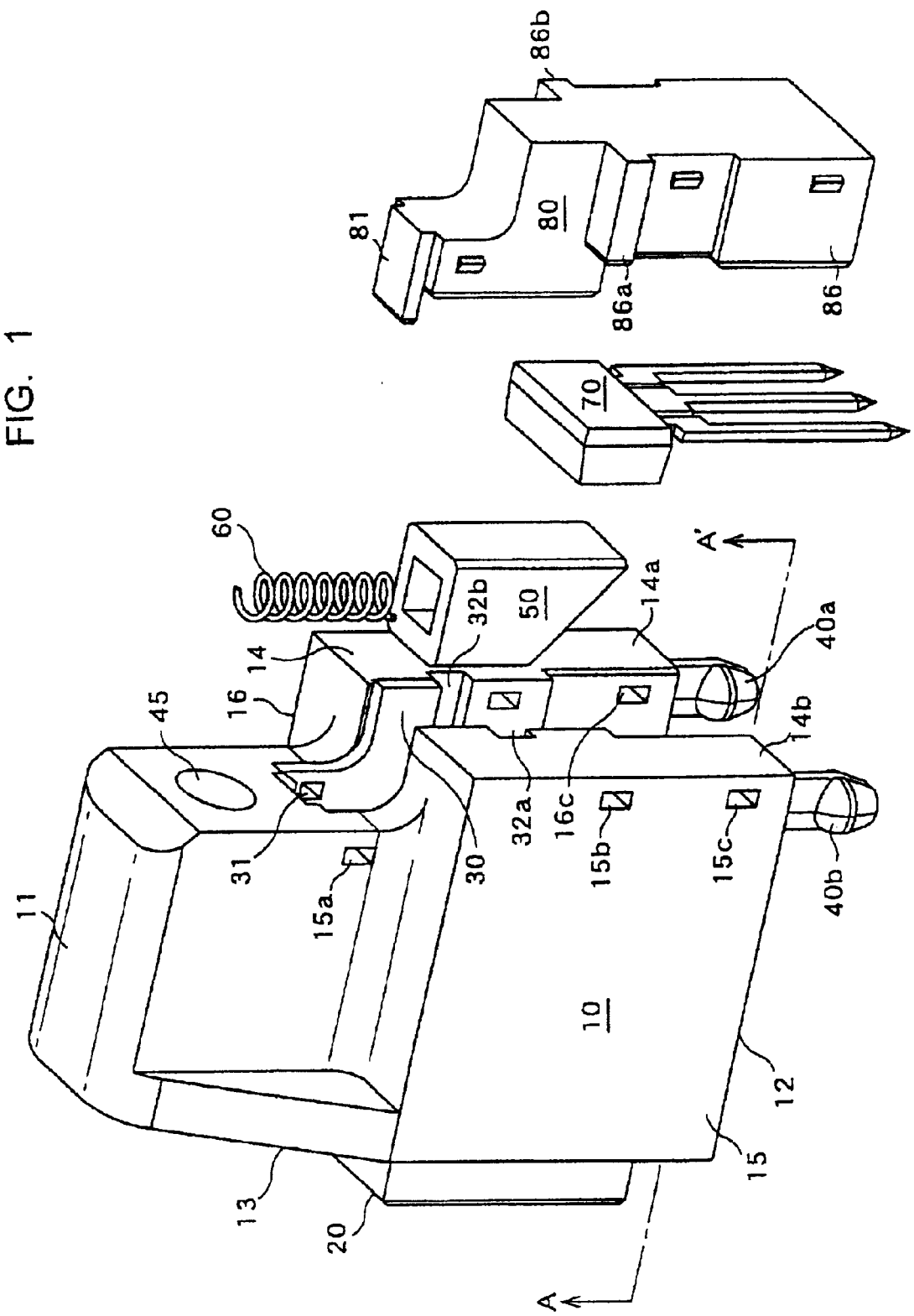
FIG. 1 shows a socket for an optical connector according to a first embodiment of the invention, and it is an exploded perspective view showing components constituting the socket for an optical connector.

FIG. 1 to FIG. 7 show a socket for an optical connector according to the first embodiment of the invention and FIG. 1 is an exploded perspective view of components constituting the socket for an optical connector. FIG. 2 shows a socket housing, wherein FIG. 2(A) is a front view, FIG. 2(B) is a side view, FIG. 2(C) is sectional view taken along a dash and one-dotted line A–A', FIG. 2(D) is a rear view and FIG. 2(E) is a plan view, and FIG. 2(F) is a bottom view. FIG. 3 shows a cover body, wherein FIG. 3(A) is a rear view, FIG. 3(B) is a side view, FIG. 3(C) is a front view, FIG. 3(D) is a plan view and FIG. 3(E) is a bottom view. FIG. 4 shows a shutter, wherein FIG. 4(A) is a front view, FIG. 4(B) is a side view, FIG. 4(C) is a rear view, FIG. 4(D) is a plan view, FIG. 4(E) is a side view of an elastic member. FIG. 5 shows an optical element, wherein FIG. 5(A) is a front view, FIG. 5(B) is a side view, and FIG. 5(C) is a plan view.

FIG. 1 is a perspective of the socket for an optical connector wherein the components constituting the socket for an optical connector are exploded, and respective components are illustrated as viewed from the side thereof. This socket comprises a socket housing 10, a shutter 50, an elastic member 60 for urging the shutter 50, an optical element 70, and a cover body 80. The socket housing 10 is formed to be substantially adapted to the EIAJ specification, thereby coupling with a plug of the same EIAJ specification. Accordingly, the socket housing 10 has a construction capable of setting a shutter therein, described later, without changing the same EIAJ specification. The individual components constituting the socket and a method of assembling the socket are now described sequentially in detail.

The socket housing 10 is formed of resin as a whole in a rectangular parallelepiped shape and includes an upper face 11, a bottom face 12, a front face 13, a rear face 14, and both sidefaces 15. The front face 13 has a cavity for allowing a plug, described later, to be inserted therein, and a fixing hole 45 is defined at the portion immediately under the upper face 11, and the bottom face 12 has attachment legs 40a, 40b, 40c which are to be attached to the devices.

Defined in the rear face of the socket housing 10 is a narrow opening 30 for allowing multiple components 50, 60, 70, and 80 to be inserted therein in this order, and allowing these components to be built in the socket housing 10. The narrow opening 30 is formed of mirror-image sidewalls 14a, 14b which are directed from the portion immediately under the fixing hole 45 to the bottom face 12, and the interval between the sidewalls 14a, 14b is set at the width for allowing the shutter 50, and the optical element optical element 70 to be inserted therethrough, and also allowing the cover body 80 to be engaged therein while fitted thereinto. The depth of the narrow opening 30, namely, the depth directing from the rear face 14 to the front face 13 is set at a length capable of reaching substantially the center of the socket housing 10, while the length of the narrow opening 30 in the vertical direction is set such that it extends from the portion immediately under the fixing hole 45 to the bottom face 12, and the lower end of the narrow opening 30 is opened. The entire shape of the narrow opening 30 is a substantially tunnel-like shape as viewed from the inlet thereof. Since the narrow opening 30 is opened at the rear face 14 and bottom face 12 to have a substantially tunnel-like shape, a mold thereof is simplified and the molding becomes easy at the time of molding. Multiple holes 15a, 15b, 15c and 16c for engaging with protrusions of the cover body 80 and a groove 31 for engaging with a guide protrusion of the cover body 80, respectively described later, are provided in the respective sidewalls 14a, 14b forming the narrow opening 30.

The shutter 50 is formed in the shape of a substantially parallelepiped column and the corners of respective walls 51 to 54 are chamfered and it is structured to be vertically slidable smoothly in a state where the shutter 50 is set in the socket housing 10. The upper face 55 has a hole 57 having a bottom for allowing an elastic member 60, e.g. a coil spring to be inserted therein. The bottom face 56 has an inclined extremity 56a while leaving a part thereof and an inclined face 58 having a given angle from the inclined extremity 56a to the front face 54. The inclined angle of the inclined face 58 is an angle to an extent that when the plug extremity is butted against the inclined face 58 strong, the plug extremity slides on the inclined face to press the inclined face 58 to push up the shutter 50 so that the shutter 50 can smoothly move. The shapes of the hole 57 having a bottom and the inclined face 58 of the shutter 50 are respectively illustrated in detail in FIG. 4(A) to FIG. 4(D). The chamfer of the respective corners of the walls in FIG. 4(D) is omitted.

The optical element 70 may be formed of either a light receiving or light emitting face 72 and it comprises a head 71 and terminals. The head 71 has a substantially block-like shape and includes the light receiving or light emitting face 72 at its front face. There are three terminals 73a to 73c and they are electrically connected to the light receiving or light emitting face 72 (see FIG. 1 and FIG. 5). A known electric connector element, i.e. male or female connector member may be used instead of the optical element 70.

The cover body 80 is fitted into the narrow opening 30 of the socket housing 10 to cover the narrow opening 30 and has the same long block shape as the narrow opening 30. The cover body 80 comprises a first guide 81 at the head 82 thereof for engaging with the groove 31, of the narrow opening 30, a pair of second guides 86a, 86b positioned immediately under a head 82 for engaging with grooves 32a, 32b of the narrow opening 30, a barrel 83, a hip 84 which bulge from the barrel 83 towards the hip 84, and protrusions 85a, 85b, 87a, 87b, 88a, 88b provided in the respective sidewalls to effect snap engagement with the engaging recesses 15a to 15c, 16a to 16c of the narrow opening 30 to fix the cover body 80 (see FIG. 1, and FIG. 3(A) to FIG. 3(E)). Since the cover body 80 covers the narrow opening 30 of the socket housing 10, it can be arbitrarily changed accompanied by the change of the shape of the narrow opening 30, and further the snap engagement serving as means for coupling between the cover body 80 and the narrow opening 30 may be changed to the slide engagement or mere engagement means. Still further, a groove may be defined in the front face of the cover body 80 for allowing the optical element 70 to be fitted thereinto and positioned therein so that the optical element 70 may be set in this groove.

An external appearance and an internal construction of the socket housing 10 is now described in detail with reference to FIG. 2(A) to FIG. 2(F). The socket housing 10 includes a cavity 20, for allowing a plug, described later, to be inserted therein, there is the front face 13 thereof, a protuberance 23 provided in the cavity 20 at the innermost part and a through hole 22 formed at the center of the protuberance 23. The through hole 22 has outer end having a size to the extent for allowing a plug extremity to be inserted therein so as to be held thereby, and the other end opposite to the optical element 70. The narrow opening 30 has a step 34a for allowing the optical element 70 to be positioned and set therein, steps provided on the inner faces of both sidewalls of the narrow opening 30 for allowing the barrel 83 and the hip 84 of the cover body 80 to be received thereby.

Further, a step 25 is provided at the bottom face close at inner end of the through hole 22 and it is designed to be butted against an inclined face 58 at the position where the shutter 50 is lowered. A large groove (not shown), for allowing an end of the inclined face to be inserted therein, may be provided instead of the step 25. Depicted by 26a, 26b are guide grooves to effect slide engagement with the guide protrusions of the plug for allowing the plug to be positioned thereby (see FIG. 2(A)).

FIG. 2(C) is a sectional view taken along a dash and one-dotted line A–A' in FIG. 1, wherein although one sidewall 14a of two sidewalls is illustrated, both sidewalls 14a, 14b are mirro-image, and the other sidewall 14b has the same structure as the sidewall 14a. An opening 24 which is cutted off towards the inner end of the through hole 22 is defined in the upper wall of the through hole 22, which is opposite to the bottom face where a step 25 is provided, while leaving a part of the upperwall of the through hole 22. The opening 24 communicates not only with the through hole 22 but also with the narrow opening 30. The size of the opening 24 is such that the shutter 50 can be inserted therein from the above, and the shutter 50 can be smoothly vertically slidable when the shutter 50 is set in the socket housing 10. Since the opening 24 communicates with the narrow opening 30, the components can be easily inserted into the through hole 22. The narrow opening 30 provided in the upward direction of the opening 24 is widened to a portion immediately close to the fixing hole 45, and the elastic member 60 expands and contracts between the narrow opening 30 and the ceiling wall. The extremity 56a of the shutter 50 is butted against the bottom face of the through hole 22 in a state where the elastic member 60 is expanded (see FIG. 2(C) and FIG. 6(D)). Depicted by 15a to 15c, 16a to 16c are holes for allowing detaching tools for use in detachment of the cover each having a pointed tip to be inserted therein when the cover body 80 is detached from the socket housing 10 from the state where the cover body 80 is fitted on the socket housing 10.

Described next with reference to FIG. 6(A) to FIG. 6(E) is a method of assembling the shutter 50, the elastic member 60, the optical element 70 and the cover body 80 in the socket housing 10.

One end of the elastic member 60 is inserted into the hole 57 having the bottom of the shutter 50, causing the shutter 50 to be assembled. Then the shutter 50 is inserted through the inclined face 58 into the opening 24 for allowing both the shutter 50 and the elastic member 60 to be disposed therein perpendicularly (see FIG. 6(B)). Further, the optical element 70 is inserted into the narrow opening 30 and finally the cover body 80 is fitted in the narrow opening 30. When the cover body 80 is fitted in the narrow opening 30, the shutter 50, the elastic member 60, the optical element 70 are respectively positioned in and fixed to the narrow opening 30 (see FIG. 6(D)).

In a state where the components of the shutter 50, the elastic member 60 and the optical element 70 are fixed inside the narrow opening 30, the extremity 56a of the shutter 50 is butted against the bottom face of the through hole 22, and the inclined face 58 is also butted against the step 25. Meanwhile, the light receiving or light emitting face 72 is butted against or brought close to the rear face 53 of the shutter 50. Accordingly, the through hole 22 is blocked up with the shutter 50, thereby blocking foreign matter from making ingress into the through hole 22, so that the foreign matter such as dust or dirt does not reach the optical element 70. Further, light from the optical element 70 is also blocked up with the shutter so the light does not leak outside (see FIGS. 6(D) and 6(E)). If a groove is provided instead of the step 25, the extremity 56a is inserted into the groove, thereby realizing the same function as the step 25.

Figure 7A:
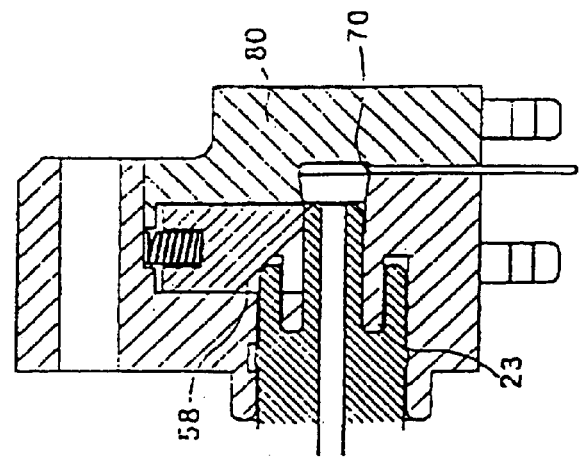
FIG. 7(A) to FIG. 7(C) are views showing a state where the plug is inserted in the socket.
Figure 7B:
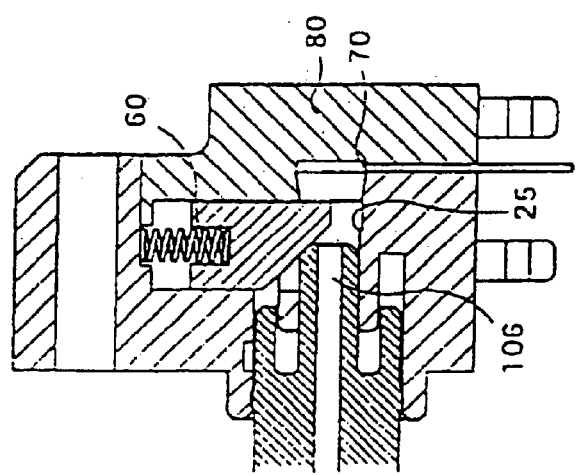
Figure 7C:
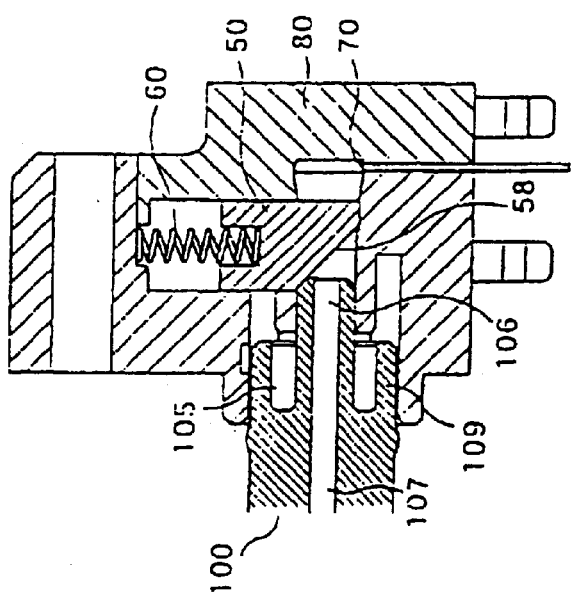

Described next with reference to FIG. 7(A) to FIG. 7(C) is the coupling between the socket and the plug. The plug is a known one and is used to be adapted, for example, to the EIAJ specification. If the plug 100 is inserted into the opening of the cavity, a plug extremity 106 is butted against the inclined face 58 (see FIG. 7(A)). If the plug 100 is further inserted into the opening of the cavity from this state, the plug extremity 106 butts against the inclined face 58 strong, causing the plug extremity 106 to slide on the inclined face 58 so that the shutter 50 starts to be moved upward against an urging force of the elastic member 60 (see FIG. 7(B)). If the plug 100 is further pushed into the opening, the shutter 50 is further moved upward so that the extremity 56a of the shutter 50 is placed on the plug extremity 106 and the tip end of optical fiber 107 is brought close to or butted against the light receiving or light emitting face 72 of the optical element 70 at the same time (see FIG. 7(C)). Conversely, if the plug 100 is pulled out from the opening, the shutter 50 is lowered owing to the urging force of the elastic member 60 so that the front face of the optical element 70 is blocked up to return to the original state (see FIG. 7(A)).

Although described in the first embodiment of the invention is the case where the opening is defined on the wall at the upper portion in the vertical direction, the opening is not limited to this position and may be formed on one wall disposed either right and left in the lateral direction of the through hole or downward in the vertical direction of the same. As a result, the shutter is differentiated in the insertion direction or movement direction but not differentiated in function.

FIG. 8 to FIG. 12 are views showing a socket for an optical connector according to a second embodiment of the invention, which is different from the first embodiment in respect of the shutter mechanism being provided vertically by pairs. Accordingly, the explanation of the components which are common to the socket housing is omitted, and the shutter mechanism is described in detail.

Figure 9C:
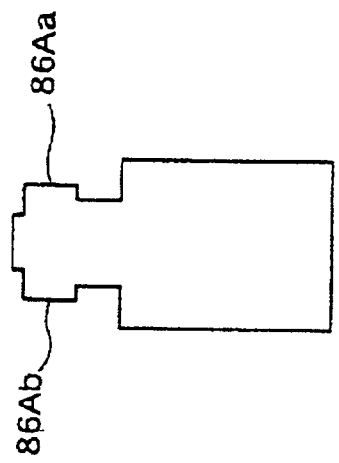
FIG. 9(C) is a rear view.
Figure 9B:
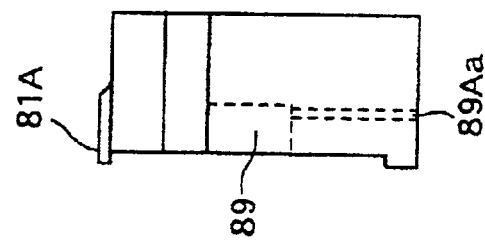
FIG. 9(B) is a side view.
Figure 9A:
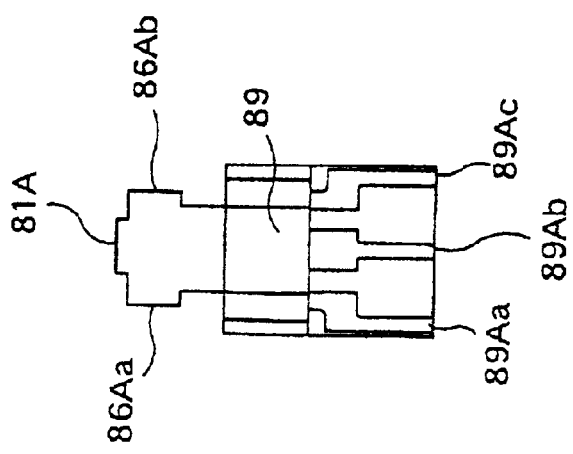
FIG. 9(A) is a front view.

FIG. 8 shows a socket housing wherein FIG. 8(A) is a front view, FIG. 8(B) is a sectional view, and FIG. 8(C) is a rear view. FIG. 9 shows a cover body wherein FIG. 9(A) is a front view, FIG. 9(B) is a side view, and FIG. 9(C) is a rear view. FIG. 10 shows a pair of shutters, wherein FIG. 10(A) is a front view of one shutter, FIG. 10(B) is a side view of the same, FIG. 10(C) is a rear view of the same and FIG. 10(D) is a plan view of the same, FIG. 10(A') is a front view of the other shutter, FIG. 10(B') is a side view of the same, FIG. 10(C') is a rear view of the same, and FIG. (E) is a side view of the elastic member.

The second embodiment is described with reference to FIGS. 8 to 12. A socket housing 10A has an opening 24A which is formed by notching at root of a protuberance 23A and communicates with a narrow opening 30A. The protuberance 23A protuberates from innermost wall face of the narrow opening 30A.

There is formed a room in the narrow opening 30A which room is expanded in the vertical direction of the socket housing 10A by a large margin and the size of the room has dimensions such that a pair of shutters 50Aa, 50Ab are disposed vertically therein. To enhance the arrangement of the pair of shutters 50Aa, 50Ab in the vertical direction with ease, a groove or step may be provided on the wall face of the narrow opening 30A having substantially the same width as each width of the pair of shutters 50Aa, 50Ab (see FIGS. 8(A) to 8(C)).

The cover body 80A covers the narrow opening 30A of the socket housing 10A and has the same shape as the narrow opening 30A for allowing the narrow opening 30A to be fitted, engaged and set therein. That is, the entire shape of the cover body 80A is long and rectangular parallelepiped and has a guide protrusion 81A provided at the head thereof for allowing the groove of the narrow opening 30A to be set and guided thereby, and a pair of protrusions 86Aa, 86Ab provided at the neck thereof for allowing the same groove to be fitted thereby, and a groove 89 extending from the barrel to the hip for allowing the optical element 70A to be fitted thereinto. The configuration of the groove 89 comprises a room for allowing the head of the optical element 70A to be fitted thereinto and grooves 89Aa to 89Ac for allowing the terminals of the optical element 70A to be fitted thereinto.

The pair of shutters 50Aa, 50Ab are substantially rectangular parallelepiped columnar and the extremities thereof have wedge-like shapes. The pair of shutters 50Aa, 50Ab are identical with each other in shape except that the protrusion piece 59A is provided on the extension of the inclined face of one shutter 50Ab. Holes 57Aa, 57Ab each having the bottom, for allowing an elastic member 60A such as a coil spring to be inserted therein, are respectively provided in each upper face of the pair of shutters 50Aa, 50Ab. Inclined faces 58Aa, 58Ab each having a given angle are provided on each bottom face while leaving the bottom faces 56Aa, 56Ab by small part. The shapes of the holes 57Aa, 57Ab each having a bottom of the pair of shutters 50Aa, 50Ab, and the shapes of the inclined faces 58Aa, 58Ab are illustrated in detail in FIG. 10(A) to FIG. 10(D), and FIG. 10(A') to FIG. 10(C'). The inclined faces are formed in wedge-like shape and inclined at a given angle from the left bottom faces 56Aa, 56Ab while leaving the bottom faces 56Aa, 56Ab by small part. The protrusion piece 59A having elasticity is formed on the extension of the inclined face of the shutter 50Ab along the entire width thereof (in the direction of the bottom face 56Ab) when molding the shutter 50Ab. The protrusion piece 59A may be formed on either the shutter 50Aa or the shutter 50Ab and it may be formed on the inclined face 56Aa. Depicted by 60Aa and 60Ab are elastic members.

Figure 11B:
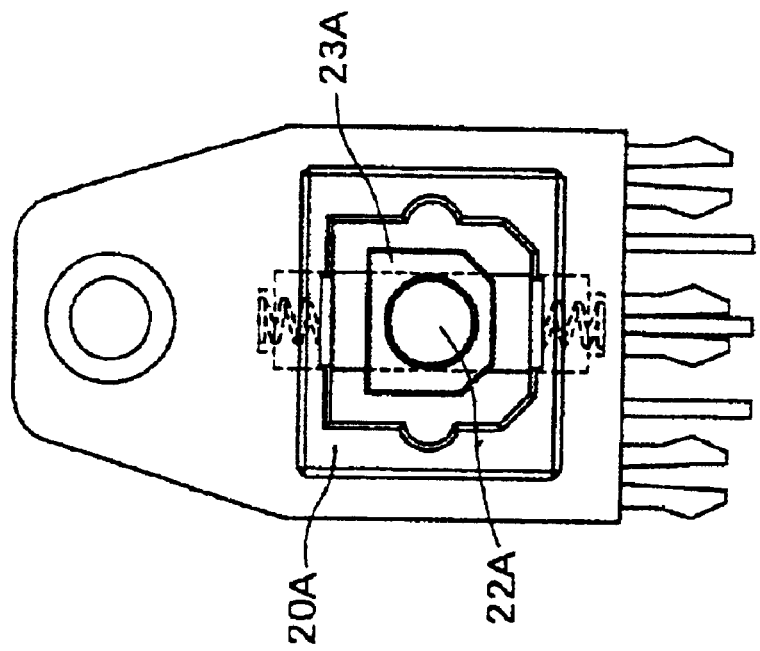
FIG. 11(B) is a front view.
Figure 11A:
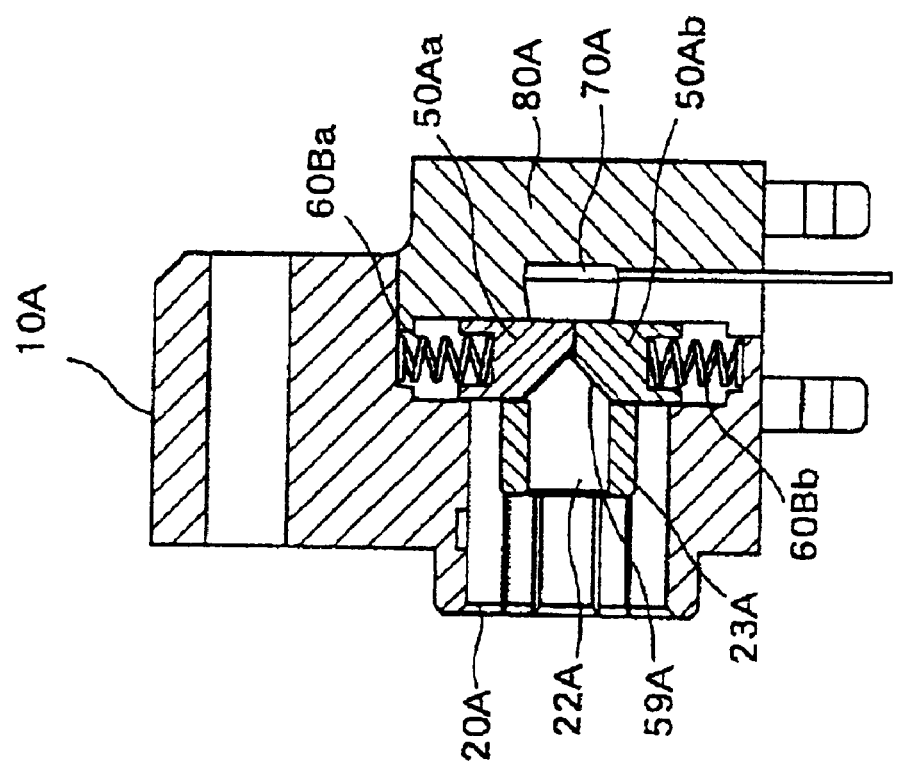
FIG. 11(A) is a sectional view.

Described next with reference to FIG. 11 is the method of assembling the components 50Aa, 50Ba, 70A into the socket housing 10. The elastic members 60Aa, 60Ab are set in the holes 57Aa, 57Ab each having the bottom of the pair of shutters 50Aa, 50Ab. Subsequently, the pair of shutters 50Aa, 50Bb for allowing the elastic members to be set therein are matched with the tips of the inclined faces 56Aa, 56Ab while the respective inclined faces are opposed each other to direct the through hole 22A, and thereafter the pair of shutters 50Aa, 50Ab are inserted towards the innermost part through the narrow opening 30A of the socket housing 10A. On the other hand, the optical element 70A is set in the groove 89 of the cover body 80A. Thereafter, the cover body 80A in which the optical element 70A is set is fitted into the narrow opening 30A (see FIG. 11(A), FIG. 11(B)).

When the cover body 80A is fitted into the narrow opening 30A, the pair of shutters 50Aa, 50Ab are positioned. Since the inclined face 58A of the shutter 50Ab has the protrusion piece 59A, the protrusion piece 59A is brought into contact under pressure with the inclined face 58Aa of the other shutter 50Aa in a state where the ends of the inclined faces 56Aa, 56Ab of the pair of shutters 50Aa, 50Ab are jointed with each other, thereby blocking up the through hole completely.

When the plug 100A is inserted into the opening of the cavity, the plug extremity 106A is butted against the inclined faces 58Aa, 58Ab of the pair of shutters 50Aa, 50Ab (see FIG. 12(A)). If the plug 100A is further pushed into the opening from this state, the plug extremity 106A is strongly butted against the inclined faces 58Aa, 58Ab so that the plug extremity 106A slides on the inclined faces 58Aa, 58Ab, and hence the pair of shutters 50Aa, 50Ab start to be moved up and down against the urging force of the elastic members 60Aa, 60Ab (see FIG. 12(B)). If the plug 100A is more further pushed into the opening, the pair of shutters 50Aa, 50Ab are further moved up and down so that the extremities of the pair of shutters 50Aa, 50Ab are placed on the plug extremity 106A, and the optical fiber 107A of the plug extremity 106A is brought close to or butted against the light receiving or light emitting face 72A of the optical element 70A (see FIG. 12(C)).

Conversely, when the plug 100A is pulled out from the opening, the pair of shutters 50Aa, 50Ab are moved owing to the urging force of the elastic members 60Aa, 60Ab, so that they return to an original state where the front face of the optical element 70A is blocked up (see FIG. 12(A)).

According to the second embodiment, since the molding of the socket housing constituting the socket becomes easy, and yet since the pair of shutters 50Aa, 50Ab are separated from each other, the closing operation of the shutter mechanism is speeded up compared with that using a single shutter, and further since the optical element is set in the cover body, the assembling of the components into the socket housing is simplified.

FIG. 13 to FIG. 16 are views showing a socket for an optical connector according to a third embodiment of the invention, which is different from the second embodiment in respect of the shutter mechanism being provided horizontally by pairs. Accordingly, the explanation of the components which are common to the socket housing is omitted, and the shutter mechanism is described in detail.

Figure 13C:
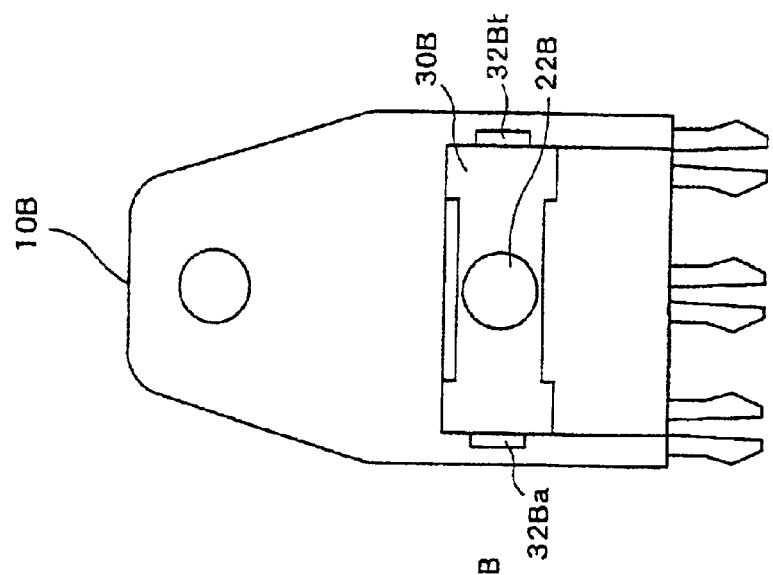
FIG. 13(C) is a rear view.
Figure 13B:
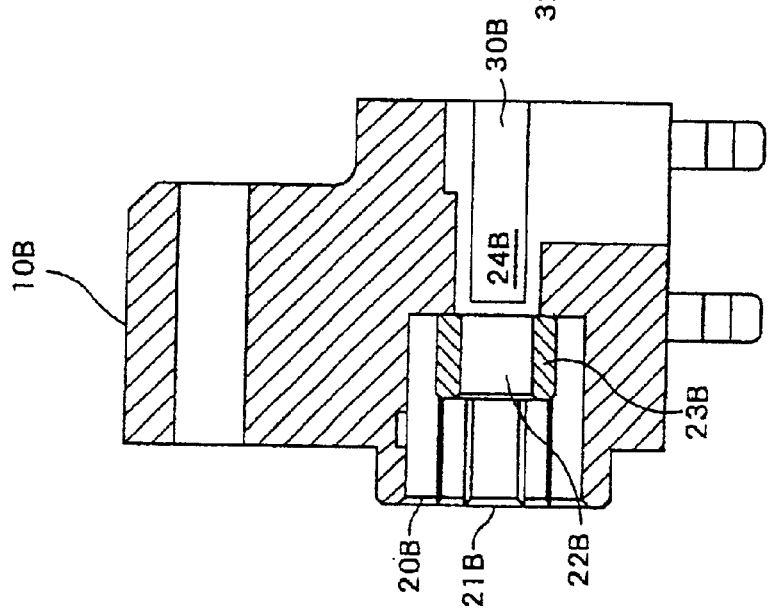
FIG. 13(B) is a sectional view.
Figure 13A:
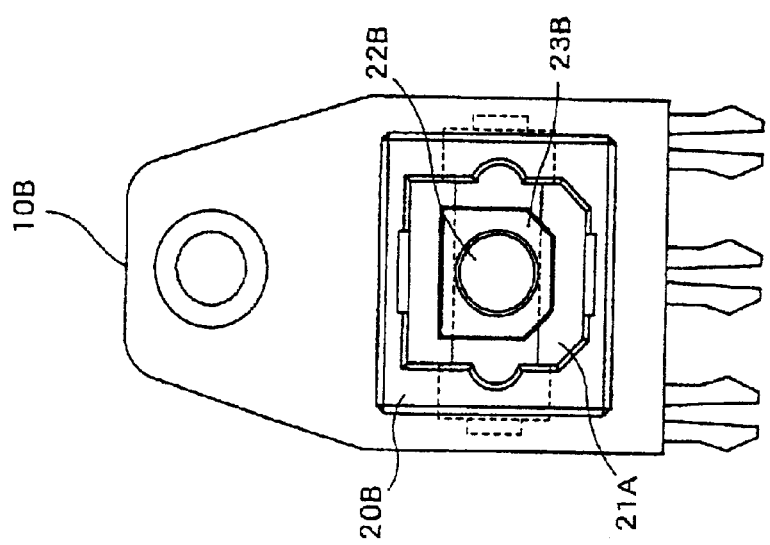
FIG. 13(A) is a front view.
Figure 14C:
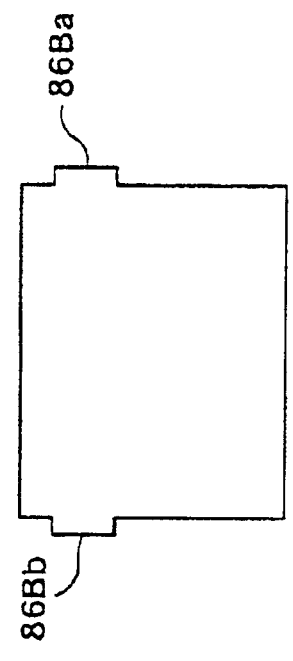
FIG. 14(C) is a rear view and FIG. 14(D) is a plan view.
Figure 14B:
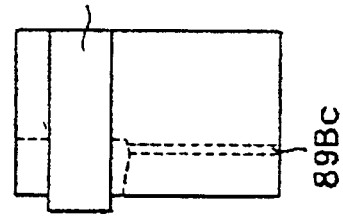
FIG. 14(B) is a side view.
Figure 14D:
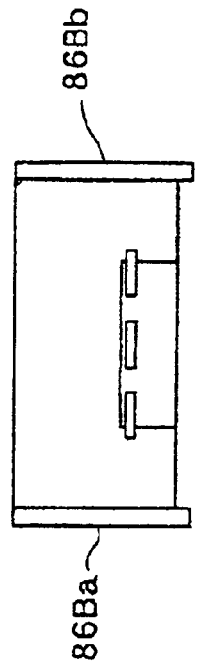
Figure 14A:
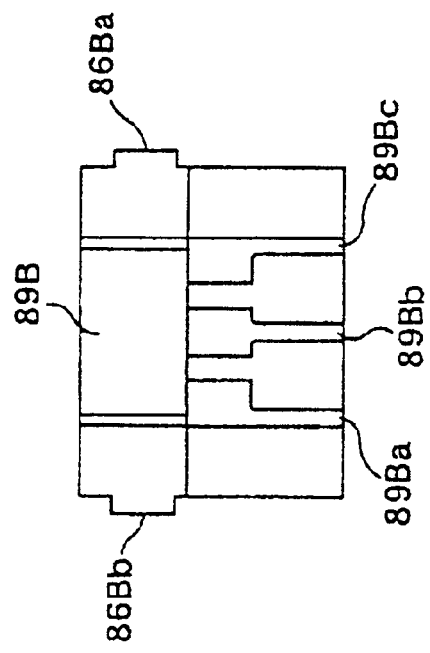
FIG. 14(A) is a front view.
Figures 17A, 17B:
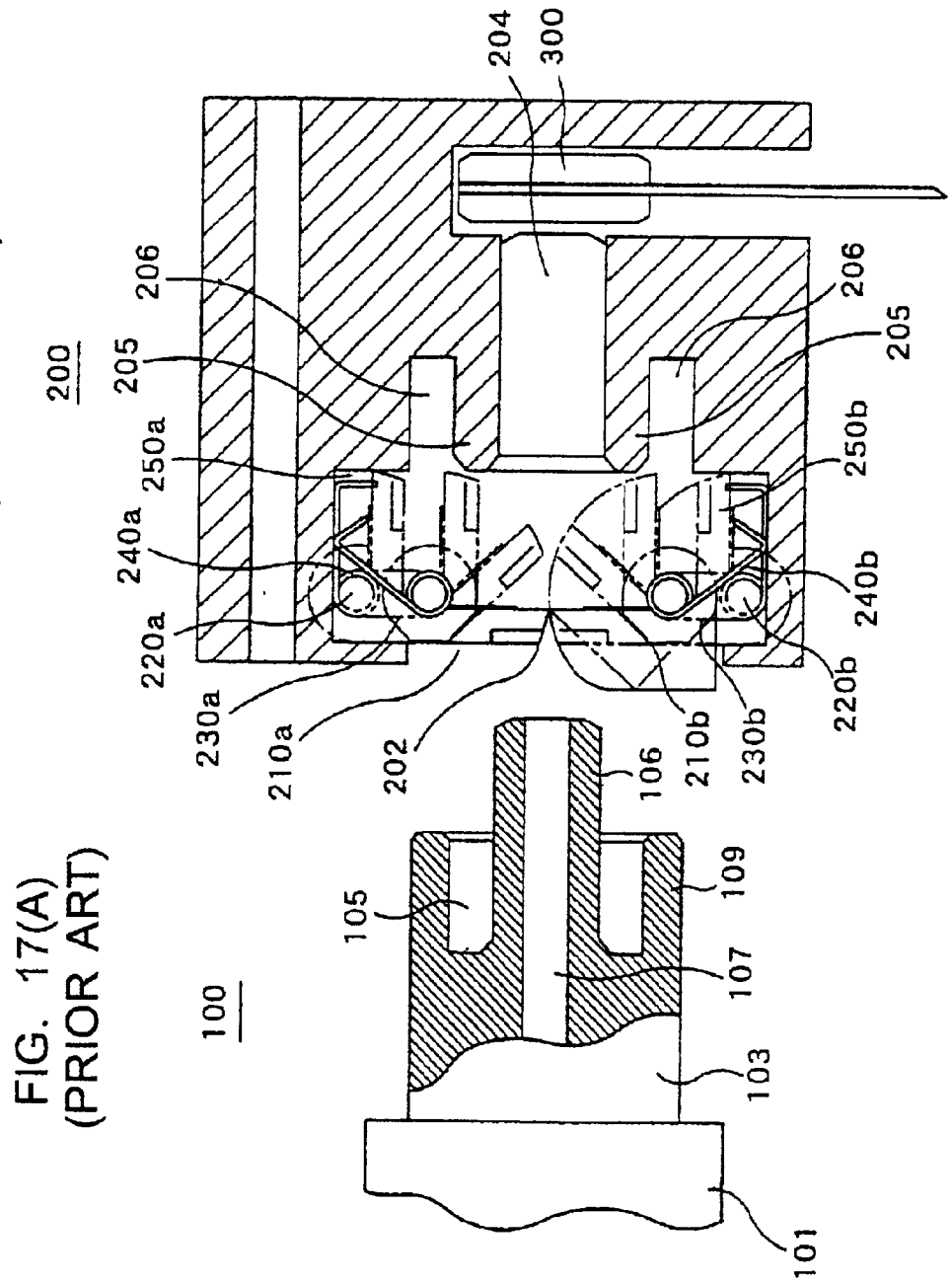
FIG. 17(A) is a fragmentary sectional view of the plug.
FIG. 17(B) is a sectional view of the socket.

FIG. 13 shows a socket housing wherein FIG. 13(A) is a front view, FIG. 13(B) is a sectional view and FIG. 13(C) is a rear view. FIG. 14 shows a cover body wherein FIG. 14(A) is a front view, FIG. 14(B) is a side view, and FIG. 14(C) is a rear view, and FIG. 14(D) is a plan view. FIG. 15 shows a pair of shutters, wherein FIG. 15(A) is a front view of one shutter, FIG. 15(B) is a side view of the same, FIG. 15(C) is a rear view of the same, FIG. 15(D) is a plan view of the same, FIG. 15(A') is a front view of the other shutter, FIG. 15(B') is a side view of the same, FIG. 15(C') is a rear view of the same and FIG. 15(E) is a side view of an elastic member.

The third embodiment is described with reference to FIGS. 13 to 16. A socket housing 10B has an opening 24B which is formed by notching at root of a protuberance 23B and communicates with the narrow opening 30B. The protuberance 23B protuberates from the innermost wall face of the narrow opening 30B.

There is formed a room in the narrow opening 30B which room is expanded in the horizontal direction of the socket housing 10B by a large margin and the size of the room has dimensions such that a pair of shutters 50Ba, 50Bb are disposed horizontally. To enhance the arrangement of the pair of shutters 50Ba, 50Bb in the horizontal direction with ease, a groove or step may be provided on the wall face of the narrow opening 30B having substantially the same width as each width of the pair of shutters 50Ba, 50Bb (see FIGS. 13(A) to 13(C)).

The cover body 80B covers the narrow opening 30B of the socket housing 10B and has the same shape as the narrow opening 30B for allowing the narrow opening 30B to be fitted, engaged and set therein. That is, the entire shape of the cover body 80B is long and rectangular parallelepiped and has a pair of guide protrusions 86Ba, 86Bb provided on both sidewalls at the shoulder thereof for allowing the groove of the narrow opening 30A to be guided thereby. A groove 89B for allowing the optical element 70B to be fitted thereinto is provided on the front face, and the configuration of the groove 89B comprises grooves 89Ba to 89Bc for allowing the head and respective terminals of the optical element 70B (see FIG. 5) to be fitted thereinto.

The pair of shutters 50Ba, 50Bb are substantially rectangular parallelepiped columnar and the extremities thereof have wedge-like shapes. The pair of shutters 50Ba, 50Bb are identical with each other in shape except that the protrusion piece 59B is provided on the extension of the inclined face of one shutter 50Bb. Holes 57Ba, 57Bb each having the bottom, for allowing elastic members 60B such as coil springs to be inserted therein, are respectively provided in each upper face of the pair of shutters 50Aa, 50Bb. Inclined faces 58Ba, 58Bb each having a given angle are provided on each bottom face while leaving the bottom faces 56Ba, 56Bb by small part. The protrusion piece 59B having elasticity is formed on the extension of the inclined face of one shutter 50Bb along the entire width thereof when molding the shutter 50Bb. The shapes of the holes 578a, 57Bb each having a bottom of the shutters 50Ba, 50Bb and the shapes of the inclined faces 58Ba, 58Bb and the shape of the protrusion 59B are respectively illustrated in detail in FIG. 15(A) to FIG. 15(D), FIG. 15(A') to FIG. 15(C'), and FIG. 15(E) is a side view of the elastic member.

Described next with reference to FIG. 16 is the method of assembling the components 50Ba, 50Bb, 60Ba, 60Bb and 70B into the socket housing 10B. The elastic members 60Ba, 60Bb are set in the holes 57Ba, 57Bb each having the bottom of the pair of shutters 50Ba, 50Bb. Subsequently, the pair of shutters 50Ba, 50Bb in which the elastic members are set are matched with the tips of the inclined faces 56Ba, 56Bb while the respective inclined faces are opposed each other to direct the through hole 22B, and thereafter the pair of shutters 50Ba, 50Bb are inserted towards the innermost part through the narrow opening 30B of the socket housing 10B (see FIG. 13(B)).

On the other hand, the optical element 70B is set in the groove 89B of the cover body 80B. Thereafter, the cover body 80B in which the optical element 70B is set is fitted into the narrow opening 30B (see FIG. 16(A), FIG. 16(B)).

When the cover body 80B is fitted into the narrow opening 30B, the pair of shutters 50Ba, 50Bb are positioned. Since the inclined face 58B of the shutter 50Bb has the protrusion piece 59B, the protrusion piece 59B is brought into contact under pressure with the inclined face 58Ba of the other shutter 50Ba in a state where the ends of the inclined faces 56Ba, 56Bb of the pair of shutters 50Ba, 50Bb are jointed with each other, thereby blocking up the through hole completely (see FIG. 16(D)). The coupling or connection and non-coupling or disconnection between the socket and the plug according to the third embodiment are the same as those according to the second embodiment except the moving direction of the shutters, namely, they move horizontally in the third embodiment while they move vertically in the second embodiment.

According to the third embodiment, since the molding of the socket housing constituting the socket becomes easy, and the pair of shutters are separated from each other, the closing operation of the shutter mechanism is speeded up compared with that using a single shutter, and further, since the optical element is set in the cover body, the assembling of the components in the socket housing is simplified.

What is claimed is:

1. A socket for a connector comprising a cavity for allowing a plug to be inserted therein from a front face, a protuberance provided within the cavity, a through hole defined substantially at the center of the protuberance, for allowing a plug extremity to be inserted from an outer end thereof, a connector element disposed at an inner end of the through hole, opposite thereto, and a narrow opening defined by the socket in a rear face, wherein
   an opening is defined in the wall of the through hole by a cut off part of the wall, and a shutter and an elastic member are inserted into the opening,
   the through hole is blocked up with the shutter by an urging force of the elastic member and the through hole is released from a blocked state upon the insertion of the plug, and
   the shutter and the elastic member are insertable into the opening through the narrow opening in the rear face of the socket.

2. The socket for a connector according to claim 1, wherein the opening is defined in the wall extending either right and left in the horizontal direction or up and down in the vertical direction.

3. The socket for a connector according to claim 1 or 2, wherein an inclined face is formed on one end face of the shutter, and when an extremity of the inclined face is butted against the through hole, the through hole is blocked with the shutter and when the inclined face is pressed by the plug extremity, the shutter is moved against the urging force of the elastic member to release the through hole from the blocked state.

4. The socket for a connector according to claim 3, wherein a groove or a step is defined at the portion where the inclined extremity of the shutter is butted against the inner face of the through hole, causing the inclined extremity of the shutter to make ingress in the groove or be butted against the step.

5. A socket for a connector comprising a cavity for allowing a plug to be inserted therein from a front face, a protuberance provided within the cavity, a through hole defined substantially at the center of the protuberance, for allowing a plug extremity to be inserted from an outer end thereof, a connector element disposed at an inner end of the through hole, opposite thereto, and a narrow opening defined by the socket in a rear face, wherein
   an opening is defined in the wall of the through hole by a cut off a part of the wall disposed opposite to the outer end of the through hole and a pair of shutters and a pair of elastic members are inserted into the opening,
   one end of each of the respective shutters is urged by the elastic members while the other end of each of the respective shutters is brought into contact with each other to block up the through hole and the through hole is released from a blocked state upon the insertion of the plug, and
   the pair of shutters and the pair of elastic members are insertable into the opening through the narrow opening in the rear face of the socket.

6. The socket for a connector according to claim 5, wherein
   the opening is defined in the walls of the through hole by a cut off part of the walls disposed opposite to the inner end of the through hole in the vertical direction, and
   when the pair of shutters is inserted into the opening, one end of each of the respective shutters is urged by the elastic members while the other end of each of the respective shutters is brought into contact with each other to block up the through hole and the through hole is released from a blocked state upon the insertion of the plug.

7. The socket for a connector according to claim 5, wherein
   the opening is defined in the walls of the through hole by a cut off part of the walls disposed opposite to the inner end of the through hole in the horizontal direction, and
   when the pair of shutters is inserted into the opening, one end of each of the respective shutters is urged by the elastic members while the other end of each of the respective shutters is brought into contact with each other to block up the through hole and the through hole is released from a blocked state upon the insertion of the plug.

8. The socket for a connector according to any of claims 5 to 7, wherein an inclined face is formed on one end face of each of the shutters while leaving extremities of the shutters on the one end face as a small part, and when the extremities of the shutters are butted against each other, the through hole is blocked up with the shutters, and when the inclined faces are pressed by the plug extremity, the shutters are moved against the urging force of the elastic members to release the through hole from the blocked state.

9. The socket for a connector according to claim 8, wherein an inclined face is formed on one end face of each of the shutters while leaving extremities of the shutters on the one end face as a small part, and a protrusion piece having elasticity is provided on the tip end of one inclined face, wherein when the extremities of the shutters are brought into contact with each other, the protrusion piece on the tip end of one inclined face is brought into contact with the other inclined face elastically to block up the through hole, and when the inclined faces are pressed by the plug extremity, the shutters are moved against the urging force of the elastic members to release the through hole from the blocked state.

10. The socket for a connector according to any of claims 1, 2, 5, 6 and 7, wherein the plug is a plug for an optical connector and the connector element is an optical element.

11. The socket for a connector according to any of claims 1, 2, 5, 6 and 7, wherein the plug is a plug for an electric connector and the connector element is an electric connector element.

12. A method of assembling a socket for a connector comprising,
   providing a socket having a cavity for allowing a plug to be inserted therein from a front face of a socket housing, said socket housing defining a narrow opening in a rear face of the socket housing for allowing a shutter or shutters and components to be inserted therein and a cover body to be fitted therein for causing the shutter or shutters and the components to be fixed therein, and inserting the shutter or shutters and the components through the narrow opening, and fitting the cover body into the narrow opening to fix the shutter or shutters and the components in the socket housing.

13. A method of assembling a socket for a connector comprising, providing a socket having a cavity for allowing a plug to be inserted therein from a front face of a socket housing, said socket housing defining a narrow opening in a rear face of the socket housing for allowing a shutter or shutters and components to be inserted in the narrow opening and for allowing a cover body to be fitted in the narrow opening for causing the shutter or shutters and the components to be fixed therein, setting the components on a front face of the cover body, and inserting the components and the cover body into the narrow opening to fix the components in the socket housing.

\* \* \* \* \*